United States Patent Office.

ADOLPH BAEYER, OF MUNICH, BAVARIA, AND ADOLPH EMMERLING, OF KIEL, PRUSSIA, GERMANY, ASSIGNORS TO BADISCHE ANILIN AND SODA FABRIK, OF MANNHEIM, BADEN, GERMANY.

MANUFACTURE OF ARTIFICIAL INDIGO.

SPECIFICATION forming part of Letters Patent No. 240,942, dated May 3, 1881.

Application filed March 9, 1881. (Specimens.)

*To all whom it may concern:*

Be it known that we, ADOLPH BAEYER, a subject of the King of Bavaria, residing at Munich, in the Kingdom of Bavaria, and ADOLPH EMMERLING, a subject of the Grand Duke of Baden, and residing at Kiel, in the Kingdom of Prussia, Germany, have invented new and useful Improvements in the Manufacture of Dye-Stuffs or Coloring-Matters, of which the following is a specification.

This invention relates to blue coloring-matters which are produced from isatine by the action of a mixture of phosphorus-trichloride, acetyl-chloride, and phosphorus, at an elevated temperature.

In carrying out this invention we take about one part, by weight, of isatine, by preference in a finely-divided state, and heat the same in a closed pressure-vessel or digester for several hours, and at a temperature of about 70° to 80° centigrade, with about fifty parts, by weight, of a mixture consisting of equal parts of phosphorus-trichloride and acetyl-chloride, and about one part, by weight, of yellow phosphorus. The result of the operation is thrown into a large quantity of cold water, and the solution, after filtration, is exposed to the action of air, whereby the liquid gradually turns blue and deposits a dark-blue precipitate. The said precipitate is separated by filtration from the mother-liquor and washed with cold water.

The blue product thus obtained resembles vegetable indigo in its outward appearance, and may be used in a manner similar to that in which vegetable indigo is now used.

It is insoluble in cold alcohol, dissolves with a blue color in hot alcohol, and in strong sulphuric acid with a yellowish-green color, changing to blue on heating. On addition of water a pure blue solution is obtained. It makes a deep-blue streak on paper, and when rubbed it shows a copper luster.

What we claim as new, and desire to secure by Letters Patent, is—

1. As a new article of manufacture, the blue dye-stuff or coloring-matter herein described, and having the properties set forth.

2. The within-described process for producing a dye-stuff or coloring-matter by the action of a mixture of phosphorus-trichloride and acetyl-chloride with yellow phosphorus on isatine, substantially in the manner set forth.

In testimony whereof we have hereunto set our hands in the presence of two subscribing witnesses.

ADOLPH BAEYER.
ADOLPH EMMERLING.

Witnesses as to Adolph Baeyer:
OSCAR R. JACKSON,
CARL A. OETTINGER.

Witnesses as to Adolph Emmerling:
TH. BECKER,
P. PETERS.